US010540075B2

(12) United States Patent
Chan et al.

(10) Patent No.: US 10,540,075 B2
(45) Date of Patent: Jan. 21, 2020

(54) SYSTEM AND METHOD TO PERFORM AN ALLOCATION USING A CONTINUOUS TWO DIRECTION SWIPE GESTURE

(71) Applicant: THE TORONTO-DOMINION BANK, Toronto (CA)

(72) Inventors: Paul Mon-Wah Chan, Toronto (CA); John Jong Suk Lee, Toronto (CA); Perry Aaron Jones Haldenby, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 455 days.

(21) Appl. No.: 15/267,930

(22) Filed: Sep. 16, 2016

(65) Prior Publication Data
US 2018/0081528 A1    Mar. 22, 2018

(51) Int. Cl.
*G06F 3/0484* (2013.01)
*G06F 9/50* (2006.01)

(52) U.S. Cl.
CPC .......... *G06F 3/04847* (2013.01); *G06F 9/505* (2013.01)

(58) Field of Classification Search
CPC .................................................. G06F 3/04847
USPC ....................................................... 715/771
See application file for complete search history.

(56) References Cited

U.S. PATENT DOCUMENTS

| 8,364,590 B1 | 1/2013 | Casey et al. | |
| 2005/0210404 A1* | 9/2005 | Hakiel | G06F 3/04855 |
| | | | 715/786 |
| 2007/0234236 A1* | 10/2007 | Champion | G06F 3/04847 |
| | | | 715/833 |
| 2009/0019383 A1* | 1/2009 | Riley | G06Q 10/10 |
| | | | 715/764 |
| 2009/0313567 A1* | 12/2009 | Kwon | G06F 3/0482 |
| | | | 715/769 |
| 2010/0039400 A1* | 2/2010 | Jang | G06F 3/0485 |
| | | | 345/173 |
| 2010/0042535 A1 | 2/2010 | Stone | |
| 2011/0107259 A1* | 5/2011 | Haugh | G06F 3/0482 |
| | | | 715/810 |

(Continued)

OTHER PUBLICATIONS

Xoom Money Transfer; Xoom-Paypal service; https://play.google.com/store/apps/details?id=com.xoom.android.app&hl=en; 2016; 3 pages.

(Continued)

*Primary Examiner* — Sherief Badawi
*Assistant Examiner* — Conrad R Pack

(57) ABSTRACT

A system, method and computer readable medium provide a gesture-based graphical user interface to determine allocation information to instruct an allocation. A gesture-based I/O device displays a graphical user interface having: an amount region configured to define an allocation amount; a plurality of source regions each configured to define an allocation source; and a plurality of destination regions each configured to define an allocation destination. Input is received via the gesture-based I/O device as a swipe gesture having at least two directions, the swipe gesture interacting with the amount region to define the allocation amount and interacting with at least one of a source region of the plurality of source regions and a destination region of the plurality of destination regions to define an allocation source and an allocation destination for the allocation amount.

21 Claims, 8 Drawing Sheets

(56) References Cited

U.S. PATENT DOCUMENTS

| | | | |
|---|---|---|---|
| 2011/0202414 A1 | 8/2011 | Nallasivan et al. | |
| 2012/0174043 A1* | 7/2012 | Queru | B60K 37/06 |
| | | | 715/863 |
| 2013/0002601 A1* | 1/2013 | McCracken | G06F 3/0416 |
| | | | 345/174 |
| 2013/0085941 A1 | 4/2013 | Rosenblatt et al. | |
| 2013/0268422 A1 | 10/2013 | Ram et al. | |
| 2014/0067654 A1* | 3/2014 | Hanson | G06Q 20/108 |
| | | | 705/39 |
| 2014/0279415 A1* | 9/2014 | Hazam | G06Q 20/10 |
| | | | 705/39 |
| 2014/0372268 A1* | 12/2014 | Hazam | G06Q 40/02 |
| | | | 705/35 |
| 2015/0019420 A1 | 1/2015 | Low et al. | |
| 2015/0206105 A1* | 7/2015 | Suzukake | G06Q 20/105 |
| | | | 705/39 |

OTHER PUBLICATIONS

Chillr-Money Transfer and Recharge; https://play.google.com/store/apps/details?id=in.chillr&hl=en; 2016; 3 pages.

* cited by examiner

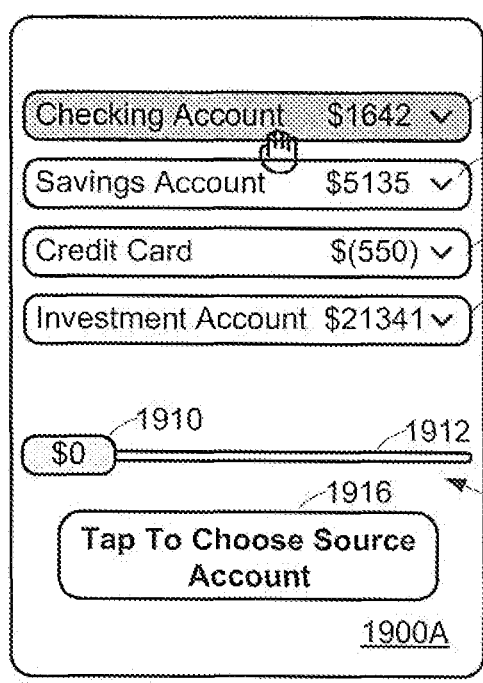
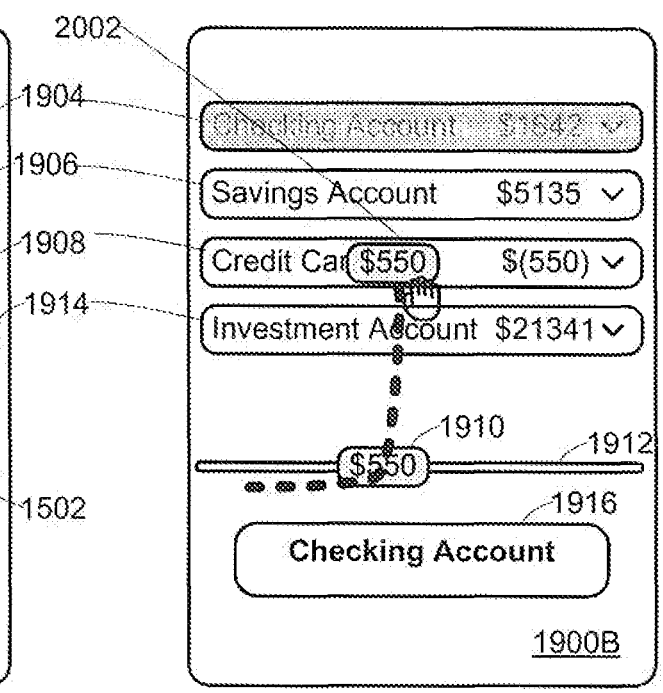
Fig. 19
Fig. 20

SYSTEM AND METHOD TO PERFORM AN ALLOCATION USING A CONTINUOUS TWO DIRECTION SWIPE GESTURE

FIELD

The present disclosure relates to gesture-based computer interfaces and more particularly to a system and method to perform an allocation using a continuous two direction swipe gesture.

BACKGROUND

Graphical user interfaces (GUIs) for functions and applications for computer and other devices enable users to receive information and provide input, for example, to invoke a function, feature or service. Graphical user interfaces can play a significant role in the user experience and satisfaction in dealing with the associated device. Complicated user interfaces may result in erroneous user input. Such input may waste computer or other resources through unnecessary action while performing or partially performing undesired functions, features or services or in correcting the input. As well, some GUIs are more resource intensive than others, using computer resources unnecessarily.

By way of example, effective money movement is an important aspect of the services provided by financial institutions. Most GUIs for money movement require the interaction with several GUI elements and do not provide a seamless interaction which can make the process of money movement difficult to use. Typically systems require at a minimum four distinct interactions with at least three distinct interaction elements: 1. Source Account, 2. Destination account, 3. transfer amount, 4. confirmation where 1 & 2 are drop down menus, 3 is a text box, 4 is a button. These interactions are significant obstacles in accomplishing the intended goal of moving money.

SUMMARY

A system, method and computer readable medium provide a gesture-based graphical user interface to determine allocation information to instruct an allocation. A gesture-based I/O device displays a graphical user interface having: an amount region configured to define an allocation amount; a plurality of source regions each configured to define an allocation source; and a plurality of destination regions each configured to define an allocation destination. Input is received via the gesture-based I/O device as a single swipe gesture having at least two directions. The single swipe gesture interacts with the amount region to define the allocation amount and interacts with at least one of one of the plurality of source regions and one of the plurality of destination regions to define an allocation source and an allocation destination for the allocation amount.

There is disclosed a computing device having a processor coupled to a memory and coupled to a gesture-based input/output (I/O) device, the memory storing instructions, which when executed by the processor, configure the computing device to: display via the gesture-based I/O device a graphical user interface having: an amount region configured to define an allocation amount; a plurality of source regions each configured to define an allocation source; and a plurality of destination regions each configured to define an allocation destination; and receive as input via the gesture-based I/O device a swipe gesture having at least two directions, the swipe gesture interacting with the amount region to define the allocation amount and interacting with at least one of: (i) a source region of the plurality of source regions and (ii) a destination region of the plurality of destination regions to define an allocation source and an allocation destination for the allocation amount.

The swipe gesture may be a single swipe gesture. The computing device may be further configured to: generate a signal to output allocation information to perform an allocation of the allocation amount from the allocation source to the allocation destination; and communicate the signal to a server to effect the allocation.

The computing device may be configured such that: the amount region may display a selectable linear slider control for movement along a line to variably define the allocation amount; the swipe gesture comprises a plurality of connected consecutive swipe components including at least two movement components; a first movement component of the plurality of consecutive connected swipe components defines the allocation amount, the first movement component moving in a first direction to interact with the selectable linear slider control for movement along the line; and a second movement component, alter the first movement component, defines the allocation source or the allocation destination, the second movement component moving in a second direction away from the line to the source region or the destination region. The computing device may be further configured to: responsive to the first movement component: display via the gesture-based I/O device a slider device of the selectable linear slider control to simulate movement along the line; raise or lower the allocation amount; and display via the gesture-based I/O device the allocation amount; and responsive to the second movement component: display via the gesture-based I/O device a second slider device to simulate movement in accordance with the movement away from the line; and determine the allocation source or allocation destination as selected by the second movement component. The computing device may be configured such that the plurality of consecutive swipe components further comprises respective pause components, pausing movement to interact with at least one of the source region and the destination region to respectively define the allocation source and allocation destination. The computing device may be configured such that the second movement component defines the allocation source; and the plurality of connected consecutive swipe components comprises a third movement component after the second movement component, the third movement component moving from the source region to the destination region to define the allocation destination.

The computing device may be configured such that: the gesture-based I/O device displays a plurality of amount regions each configured to define an allocation amount; each of the plurality of amount regions displaying a respective selectable linear slider control for movement along a respective line; the plurality of amount regions are associated with respective ones of the plurality of source regions; the swipe gesture comprises a plurality of consecutive swipe components including at least two movement components; a first movement component of the plurality of consecutive swipe components selects one respective selectable linear slider control thereby selecting the source region to define the allocation source, the first movement component moving in a first direction to interact with the one respective selectable slider control for movement along the respective line to define the allocation amount; and a second movement component, after the first movement component, of the plurality of consecutive swipe components defines the allocation destination, the second movement component moving in a second direction away from the respective line to the destination region. The computing device may be further configured to: responsive to the first movement component: display via the gesture-based I/O device a slider device of the one respective selectable linear slider control to simulate movement along the line; raise or lower the allocation amount; display via the gesture-based I/O device the allocation amount for display; and responsive to the second movement component: display via the gesture-based I/O device a second slider device to simulate movement away from the respective line; and determine the allocation destination as selected by the second movement component to the destination region. The computing device may be configured such that the plurality of consecutive swipe components comprises a pause component pausing movement to interact with the destination region to define the allocation destination.

The computing device may be configured such that the swipe gesture comprises a plurality of consecutive swipe components including movement components and pause components and the computing device is configured to display via the gesture-based I/O device the plurality of destination regions following a pause component interacting with the source region which defines the allocation source.

The gesture-based input/output device may be a touch sensitive display screen device.

There is disclosed a method implemented by a computing device having a processor coupled to a memory and coupled to a gesture-based input/output (I/O) device, the method comprising: displaying via the gesture-based I/O device a graphical user interface having: an amount region configured to define an allocation amount; a plurality of source regions each configured to define an allocation source; and a plurality of destination regions each configured to define an allocation destination; and receiving as input via the gesture-based I/O device a swipe gesture having at least two directions, the swipe gesture interacting with the amount region to define the allocation amount and interacting with at least one of (i) a source region of the plurality of source regions and (ii) a destination region of the plurality of destination regions to define an allocation source and an allocation destination for the allocation amount.

BRIEF DESCRIPTION OF THE DRAWINGS

FIGS. 3-20 are diagrams illustrating example graphical user interfaces, in accordance with one or more aspects of the present disclosure.

DETAILED DESCRIPTION

Figure 1:
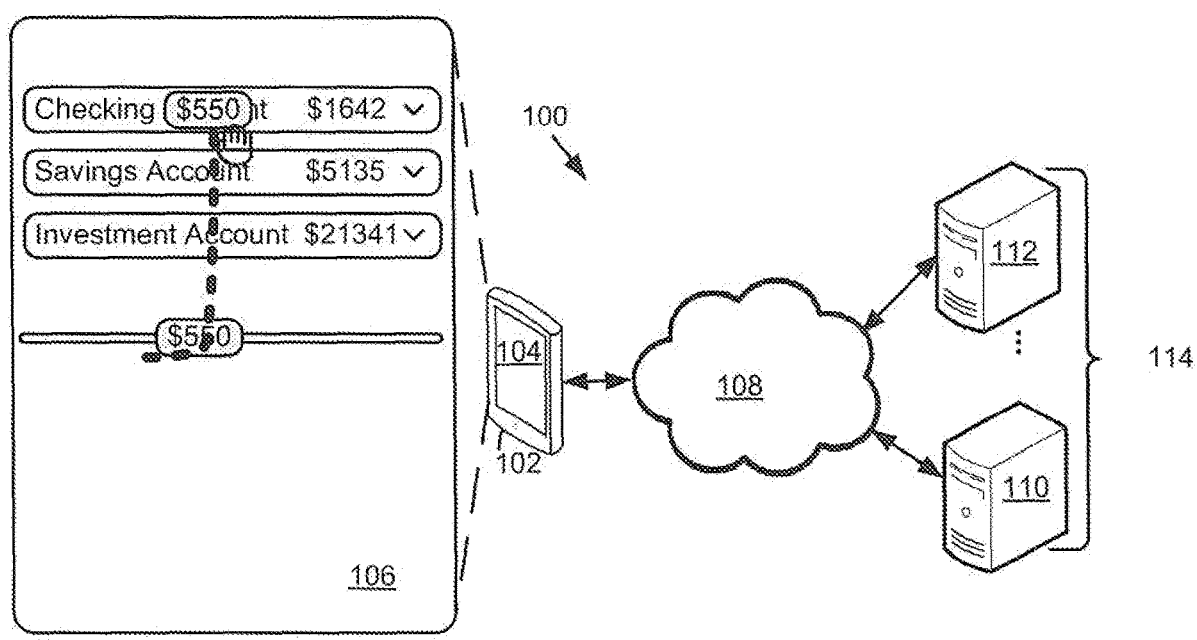
FIG. 1 is a diagram illustrating an example computing device communicating in a communication network and configured to output for display a graphical user interface via a gesture-based input/output (I/O) device, in accordance with one or more aspects of the present disclosure.

FIG. 1 is a diagram illustrating an example computer network 100 in which an example computing device 102 is configured to display, via a gesture-based I/O device 104, a graphical user interface (GUI) 106, in accordance with one or more aspects of the present disclosure. The computing device 102 is communicating using one or more communication networks 108 with one or more other computing devices (e.g. 110 and 112 and collectively 114). Computing device 102, using GUI 106, may receive input to determine an allocation amount, allocation source and allocation destination and generate and output a signal to provide allocation information to one or more of the other computing devices 106 to perform an allocation. An allocation may comprise any of a variety of transactions such as a financial transaction, bill payment, money transfers, stock purchases or sales, asset purchases or sales transfers, currency conversions, etc.

In the example of FIG. 1, computing device 102 is a mobile phone. Other examples of computing device 102 may be a tablet computer, a personal digital assistant (PDA), a laptop computer, a tabletop computer, a portable gaming device, a portable media player, an e-book reader, a watch, or another type of computing device. In the example of FIG. 1, other computing devices are servers 114. While allocations are typically performed by servers, other types of computing devices may be utilized such as mainframes, and other higher performance computing devices, etc.; however, allocations may be performed on personal computers, workstations, laptops, etc. Each of these is an example of a computing device having at least one processing device and memory.

It will be understood that computing device 102 may not communicate directly with the computing device performing the allocation per se but may communicate with a server configured to receive and initially handle requests from a mobile device (e.g. a mobile processing server), a Web server or other type of server. To complete a transaction, such as a mobile payment, computing device 102 may communicate with more than one server. Other configurations are also known to those skilled in the art.

Computing device 102 is coupled for communication to a wide area network (WAN) 108 such as the Internet. Network 108 is coupled for communication with a plurality of computing devices (e.g. servers 110 and 112). It is understood that representative communication network 100 is simplified for illustrative purposes. Additional networks may also be coupled to network 108 such as a wireless network between WAN 108 and computing device 102 (not shown).

Although the present disclosure illustrates and discusses a gesture-based I/O device 104 primarily in the form of a screen device with IO capabilities (e.g. touchscreen), other examples of gesture-based I/O devices may be utilized which may detect movement and which may not comprise a screen per se. Computing device 102 may receive gesture-based input from a track pad/touch pad, one or more cameras, or another presence or gesture sensitive input device, where presence means presence aspects of a user including for example motion of all or part of the user.

Computing device 102 may generate output for display on the screen device or in some examples, for display by a projector, monitor or other display device. It will be understood that gesture-based I/O device 104 as a screen device may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

Gesture-based I/O device 104 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 104. Gesture-based I/O device 104 and may also include non-tap gestures. Gesture-based I/O device 104 may output or display information, such as a graphical user interface (106), to a user. The gesture-based I/O device 104 may present various applications, functions and capabilities of the computing device 102 including, for example, messaging applications, telephone communications, contact and calendar applications, Web browsing applications, game applications, e-book applications and financial, payment and other transaction applications or functions among others.

Servers 114 may be configured to perform one or more types of allocations (a type of transaction) as instructed by computing device 102. The allocations may relate to an account of a user of computing device 102 held with a financial service provider for example. Servers 114 may store account data, which may include account identification information identifying one or more accounts of customers of the financial service provider (e.g., a business entity associated with servers 114). In one example, account identification information may include financial service account information. For example, such financial service account information may include a checking account, a savings account, a revolving credit line, an account linked to a credit or debit card, a brokerage account, and any additional or alternate account provided or supported by the financial service provider (e.g., an issuing bank or financial institution). In other embodiments, account data may include information identifying investment portfolios held by one or more customers of the financial service provider. Servers 114 may store transaction data may include information identifying one or more transactions involving one or more customers or accounts of a financial service provider. In one embodiment, such transactions may include, but are not limited to, purchase transactions (e.g., purchases of goods and/or services from electronic or physical retailers), financial service transactions (e.g., fund transfers), bill payment transactions (e.g., electronic bill payment transactions), financial instrument or security transactions (e.g., purchases of securities), deposits or withdrawals of funds, or applications for credit from the financial service provider or other entity.

Figure 2:
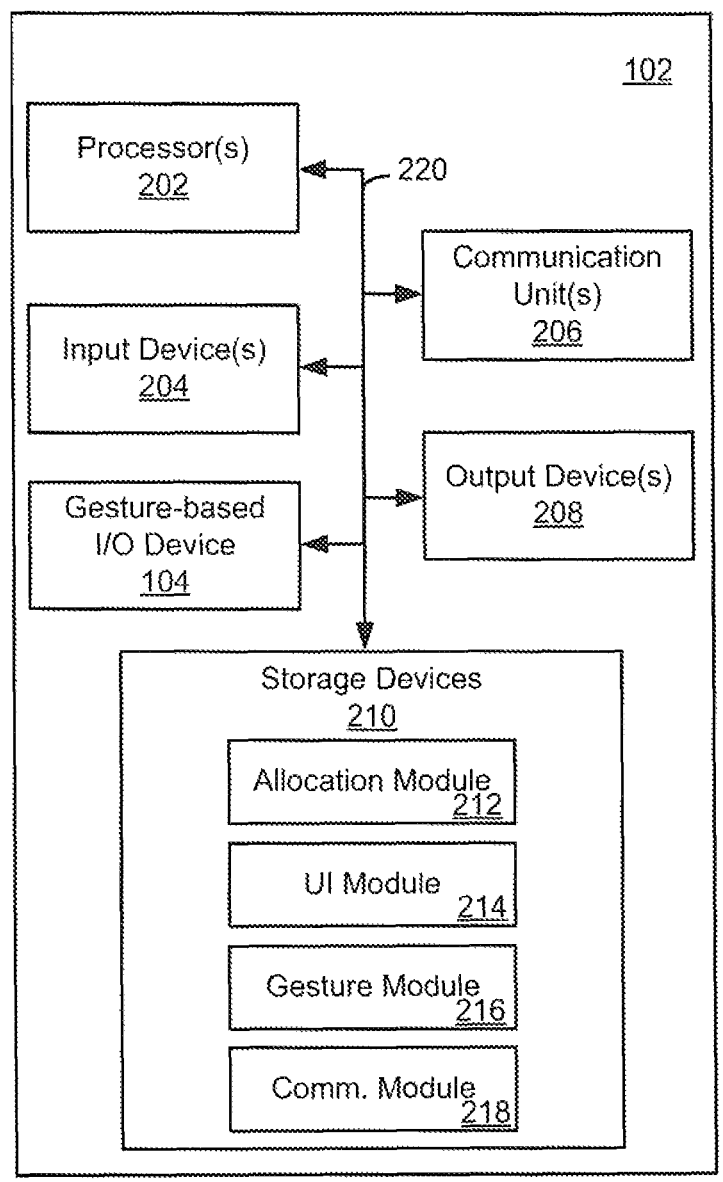
FIG. 2 is a diagram illustrating an example computing device, in accordance with one or more aspects of the present disclosure.

FIG. 2 is a diagram illustrating in block form an example computing device (e.g. 102), in accordance with one or more aspects of the present disclosure, for example, to provide a system and perform a method to complete an allocation. Computing device 102 comprises one or more processors 202, one or more input devices 204, gesture-based I/O device 104, one or more communication units 206 and one or more output devices 208. Computing device 102 also includes one or more storage devices 210 storing one or more modules such as allocation module 212, UI module 214, gesture module 216 and communication module 218. Communication channels 220 may couple each of the components 104, 202, 204, 206, 208, 210, 212, 214, 216 and 218 for inter-component communications, whether communicatively, physically and/or operatively. In some examples, communication channels 220 may include a system bus, a network connection, an inter-process communication data structure, or any other method for communicating data.

One or more processors 202 may implement functionality and/or execute instructions within computing device 102. For example, processors 202 may be configured to receive instructions and/or data from storage devices 210 to execute the functionality of the modules shown in FIG. 2, among others (e.g. operating system, applications, etc.) Computing device 102 may store data/information to storage devices 210. Some of the functionality is described further herein below.

One or more communication units 206 may communicate with external devices such as servers 110 and 112, etc. via one or more networks (e.g. 108) by transmitting and/or receiving network signals on the one or more networks. The communication units may include various antennae and/or network interface cards, etc. for wireless and/or wired communications.

Input and output devices may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. 220).

The one or more storage devices 210 may store instructions and/or data for processing during operation of computing device 102. The one or more storage devices may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Allocation module 212 may be configured to obtain allocation information to instruct the performance of an allocation such has on behalf of the user. Allocation module 212 may cooperate with UI module 214 and gesture module 216 to present a user interface and receive gesture input via gesture-based I/O device 104. Certain information to present in the user interface may be obtained from servers 110 or 112 for example, looking up data stored on behalf of a user instructing the allocation.

Allocation information may be determined at least in part by the user input and communicated to at least one of the servers 108, 110 to perform the allocation. In one example, the allocation may be a money transfer, transferring an amount of money from a source account (e.g. checking account) to a destination account (such as a saving account). In one example, allocation module 212 may comprise an application (whether native or browser-based) from a financial service provider where the user has one or more accounts. Allocation module 212 may also be configured to provide functionality to transfer money to other accounts or destinations such as a credit card, investment account, mortgage, bill payment, another individual, to perform investment sales or purchases, to perform currency purchases, etc. For security reasons and for data currency reasons, it may be preferred to store certain allocation information (e.g. user accounts held at a financial service provider) and other related information (e.g. account balances, personal information, etc.) remotely in respective of computer device 102, obtaining such information just prior to instructing an allocation, such as after a secure sign-on operation on start-up of allocation module 212 or after a period of inactivity. Allocation information and other related information may be only stored temporarily on computing device 102.

Gesture module 216 may receive input from gesture-based I/O device 104 entered via the touchscreen, processing same for communication with allocation module 212 and/or UI module 214 and/or others not shown. In some configurations, the gesture module 216 may be a component of an operating system. In response to input detected by gesture-based I/O device 104, gesture module 216 may receive information for processing. The information may be aggregated or grouped to generate one or more touch or gesture events. The events may include data representing a location on gesture-based I/O device 104 where the input is received, a time when the input or part thereof is received at the location, and/or a direction component (e.g. push down, pull up, lateral motion). The touch events may be communicated to the allocation module 212 and/or UI module 214 for further processing.

Allocation module 212 and/or UI module 214 may use the data associated with the one or more touch events to determine a response. In one example, allocation module 212 may, based on the location components of these touch events, increase or decrease an allocation amount and may invoke UI module 214 to modify the GUI for output via gesture-based I/O device 104 to reflect the change in the amount. Allocation module 212 may generate a signal comprising allocation information to instruct the performance of the allocation and communicate (e.g. via communication module 218) the signal such as to one or more of servers 114. It will be understood that a swipe operation requires a continuous interaction with the interface elements of the device and the device can provide the user with interaction references to allow for easier targeting for the user. This is not the case for tap-based interfaces. These require the user to completely disconnect their interaction with the relevant module or component processing the tap interaction to retarget the next step (e.g. tap) in the interface. Such can lead to errors in inputting and thus errors in or otherwise wasted operations by the device or system with which the device is communicating as the device and/or system processes that erroneous input.

It is understood that operations may not fall exactly within the modules 212-218 of FIG. 2 such that one module may assist with the functionality of another.

FIGS. 3-20 are diagrams illustrating example graphical user interfaces, in accordance with one or more aspects of the present disclosure. These GUIs may be generated by computing device 102 for output by gesture-based I/O device 104. FIGS. 3-10 illustrate a GUI for instructing an allocation comprising a money transfer of an allocation amount between an allocation source and an allocation destination.

Figure 3:
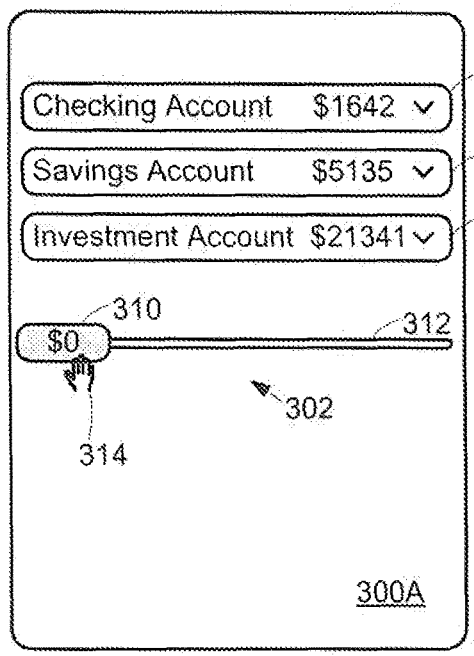

FIG. 3 shows GUI 300A comprising a selectable linear slider control 302 displayed in an amount region of the screen of gesture-based I/O device 104 and a plurality of allocation regions 304-308 having associated accounts (e.g. a checking account, savings account and investment account) displayed in respective regions of gesture-based I/O device 104. Slider control 302 comprises a slider device 310 configured for movement along a line 312. Moving the slider device 310 in a first direction (e.g. to the right) increases an allocation amount associated with the slider control 302 and moving the slider device 310 in a second direction (e.g. to the left) decreases the amount. The amount may be displayed and updated such as within the slider device 310 as the amount is selected by movement of the slider device 310. FIG. 3 shows a representative illustration of a user hand 314 interacting with the slider device where the hand may represent a finger or pointer such as a stylus in contact with the screen of the gesture-based I/O device 104. A touch at a location on the screen of the slider device 310 may activate the slider device 310 for movement. Moving the finger or pointer along the direction of the line to the right in the example while still touching the screen about the slider device 310 moves the slider device 310 and increases the amount. It is understood that the slider may be oriented in a different direction about the screen of gesture-based I/O device 104.

Figure 4:
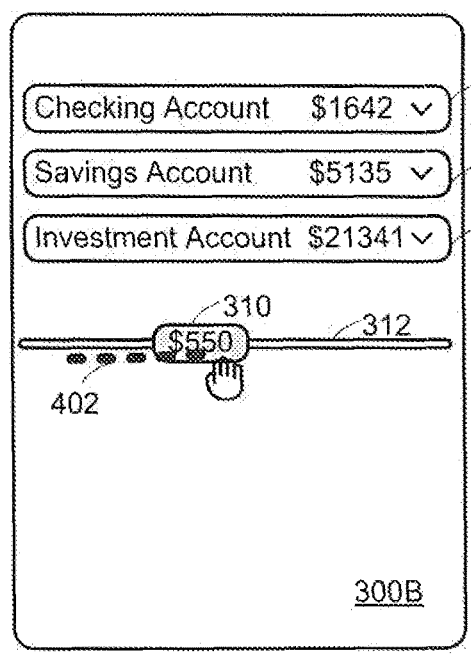

FIG. 4 shows GUI 300B following input of touch events moving the slider device 310 in a first direction along the line 312 where the amount is updated from $0 to $550. These touch events may define a first movement component of a single swipe gesture having two directions. The movement is illustrated for clarity by a dotted line 402, which ordinarily would not be shown in gesture-based I/O device 104.

Figure 5:
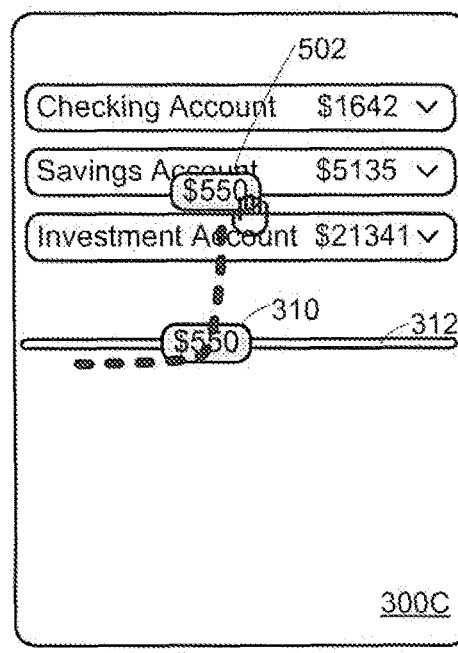
Figure 6:
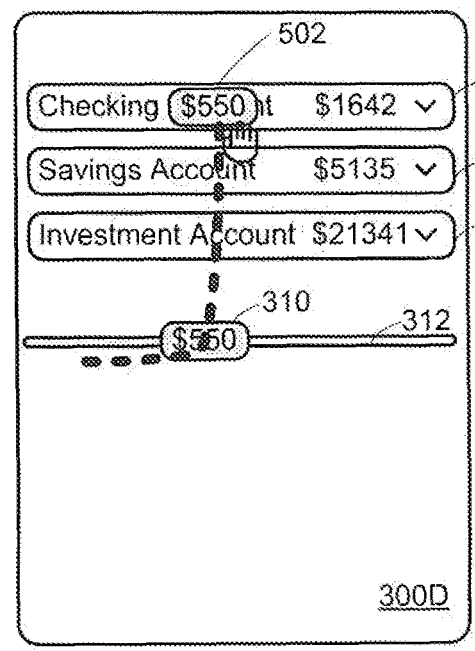
Figure 7:
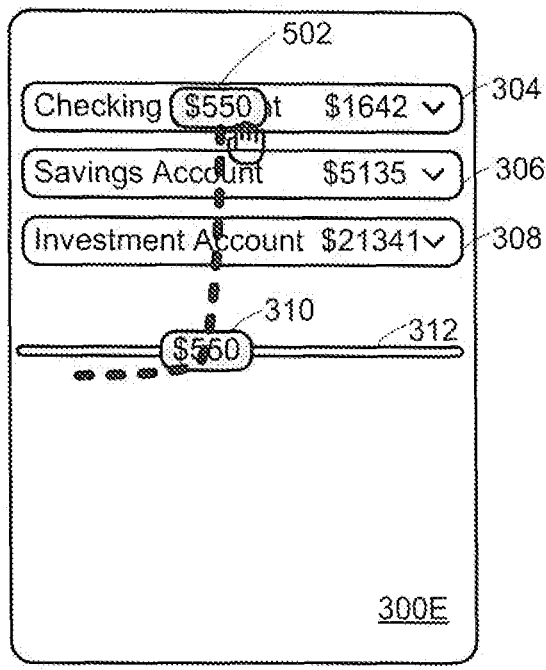

In accordance with the present example, and with respect to GUIs 300C and 300D of FIGS. 5 and 6, to instruct the allocation source for the allocation, the swipe gesture is continued in a second direction, away from the line 312 to one of the plurality of allocation regions associated with respective sources. GUI 300C shows the swipe passing over some of the plurality of allocation regions to the region 304 associated with the desired source (checking account). The movement is further illustrated by the continued dotted line. In the present example, a representation of the slider device 310 (e.g. a further instance thereof 502) displaying the selected allocation amount is displayed in response to the second movement component of the swipe, moving away from the line 312. The location of the second slider device 502 is updated as the movement progresses (e.g. responsive to the touch events).

A pause component, where movement of the finger/pointer (and hence slider device 502) is paused or held over the location of the allocation region 304 selects the associated account. As shown in GUI 300E of FIG. 7, the GUI may be updated to indicate the selection of the particular source (e.g. (checking account) such as by changing a colour or shade of the graphical element representing the allocation source at region 304. Other manners of visually representing the selection are possible.

Figure 8:
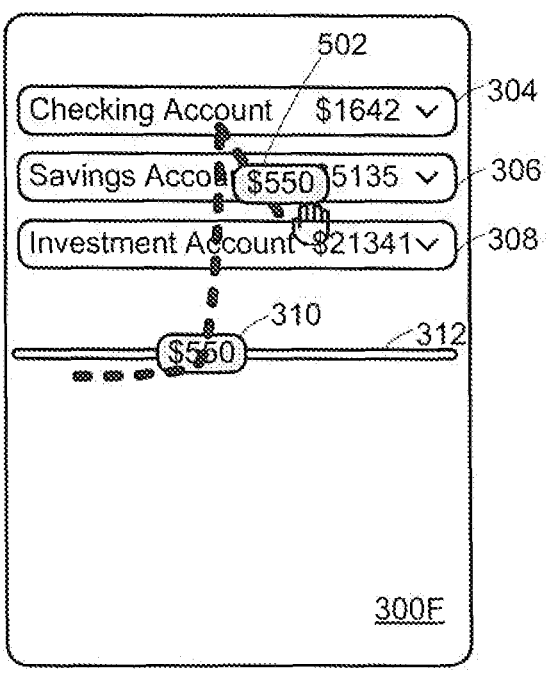
Figure 9:
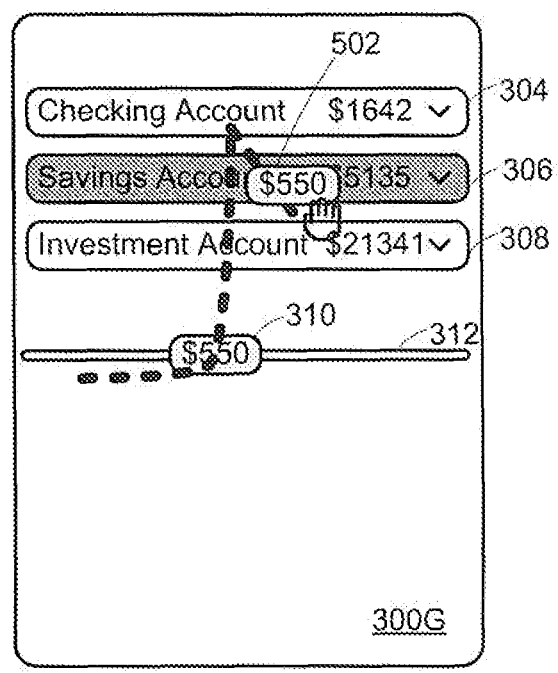
Figure 10:
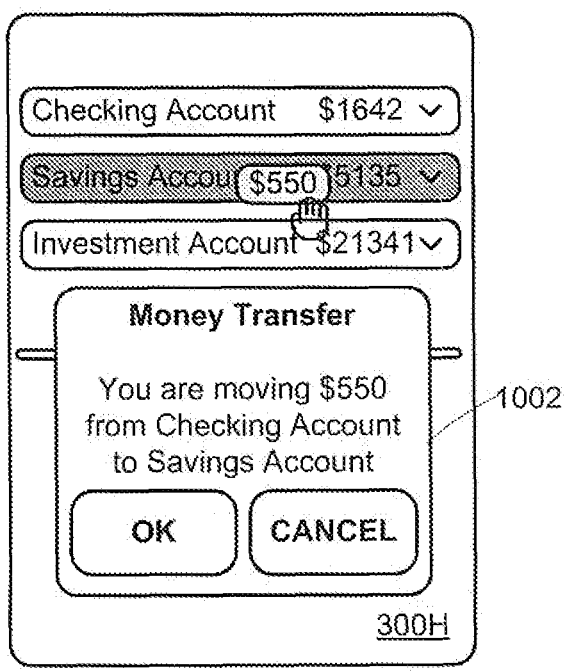

To instruct a destination account, a third movement component to move the finger/pointer to an allocation region is shown in GUI 300F of FIG. 8. Touch events are received (e.g. via gesture module 216) and the GUI 300F updated in response to move slider device 502. Similarly to FIGS. 6 and 7, pausing movement over one of the other accounts displayed in the GUI 300F selects the account as the allocation destination. This account selection may be noted by updating a colour or shade of the graphical element representing the account on the location of the screen (e.g. GUI 300G of FIG. 9). The slider device 502 may be moved and displayed in response to this third movement in a similar manner as previously described. FIG. 10 illustrates GUI 300H showing a confirmation dialog and control 1002 to approve or cancel the allocation instruction.

If the finger/pointer is lifted before completing the selection of the allocation destination, the lifting input terminates the continuous swipe gesture to cancel the allocation. The finger may be lifted before or after the selection of the allocation source for example. If after, the selection of the allocation source may be reset and the GUI updated accordingly. The allocation amount may remain or be reset and the GUI updated.

Following selection of one of the plurality of allocation sources associated to a respective account, the allocation regions displaying the other accounts are defined or treated as allocation destinations. The same accounts may be a source or a destination depending on the order in which they are chosen, for example, in accordance with the configuration of allocation module 212. It is also understood that some accounts may only be destination accounts such as for bill payments, transfers to individuals, etc. such that the accounts presented may differ after a source is selected. In other examples of allocation module 212, the destination account may be selected first. GUIs may be configured to display (or to output audibly) user instructions about which account is to be selected first.

Figure 11:
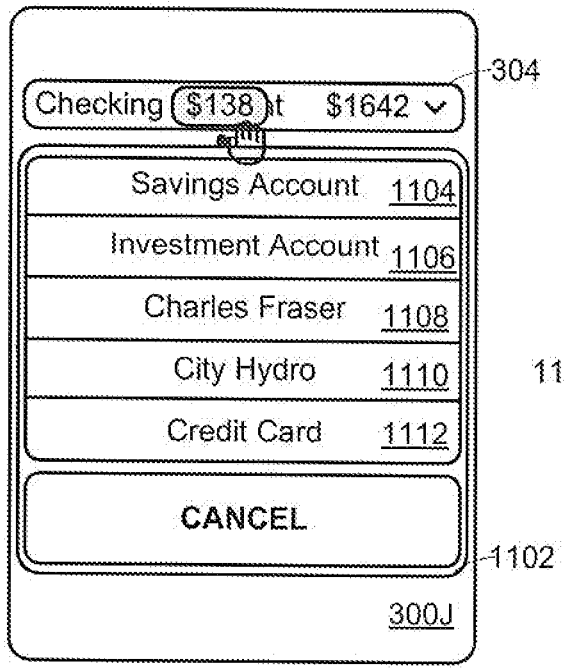
Figure 12:
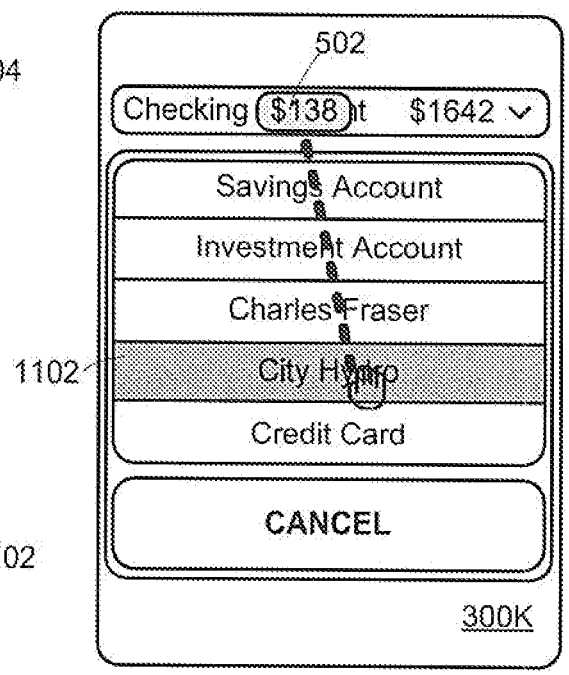

FIG. 11 shows GUI 330J in accordance with another example. In the present example, though not shown, a single swipe gesturer having two directions has been received relative to slider device 310 to select an amount of $138 and to move the second instance of the slider device 502 to select the source account 304.

Figure 13:
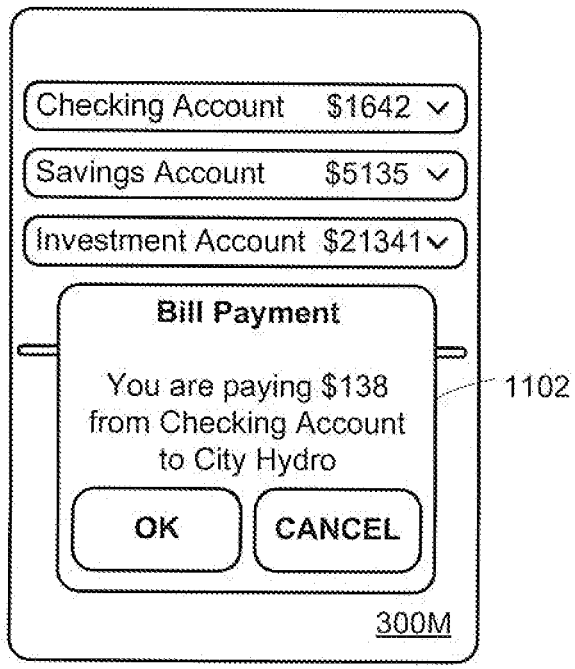

In the present example, which is different from GUIs 300E-300G, selection of the allocation source such as by pausing over the location on the screen invokes the display of a plurality of allocation destination regions 1104-1112 associated with respective destinations such as accounts, individuals, businesses, credit cards, etc. each having respective locations on the screen. The allocation destinations may be displayed in an overlay control 1102. A third movement component of the single swipe gesture may be received as touch events to move to select the desired destination. Pausing movement over the allocation region on the screen of gesture-based I/O device 104 selects the associated destination (e.g. 1202) as shown in GUI 300K of FIG. 12. In the present example, the desired destination is "City Hydro" reflecting a bill payment. In this example, slider device 502 is not updated in response to the movement but could be. Similarly in the other GUIs. Slider device 502 may not be employed or moved. FIG. 13 illustrates GUI 300M showing a confirmation dialog and control 1302 to approve or cancel the allocation instruction for the bill payment.

In a further example, movement to an allocation source (or destination) followed by a second level touch (e.g. force touch/sure click) may invoke the display of a longer list of allocation sources (or allocation destinations). The GUI for same may appear similar to GUI 3003 of FIG. 11 for example.

Figure 14:
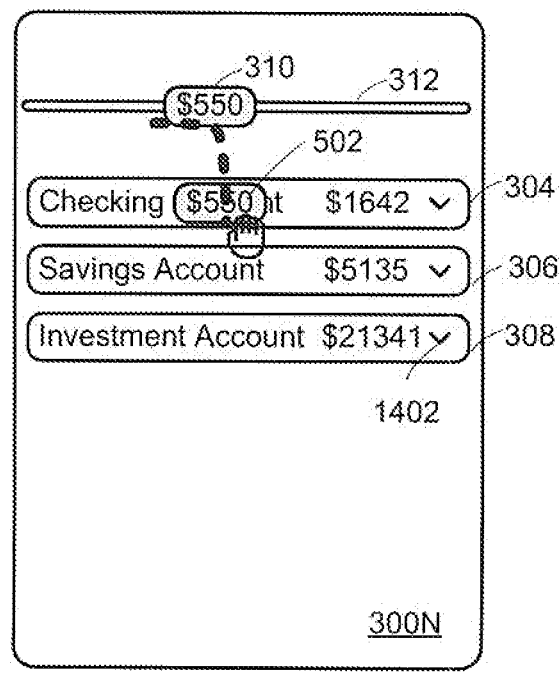

FIG. 14 shows GUI 300N, similar to GUI 300B but where the slider control is shown in a different region of the screen, above (top to bottom-wise, relative to the screen) the regions displaying the plurality of allocation sources 304, 306 and 308. A single swipe gesture having two directions is shown by the dotted line. It may be observed that the allocation source (or destinations) may be associated with association controls (e.g. 1502) which may be invoked such as by tapping the region of the screen where one of the controls 1502 is displayed to drop down a list of candidate accounts, people, businesses, credit cards, etc. for selection to define the association between the region on the screen and the selected candidate source or destination. In this way, for example, the user may configure the GUI to display favourite or regularly used accounts, people, etc. or to do so for a single occurrence.

Figure 15:
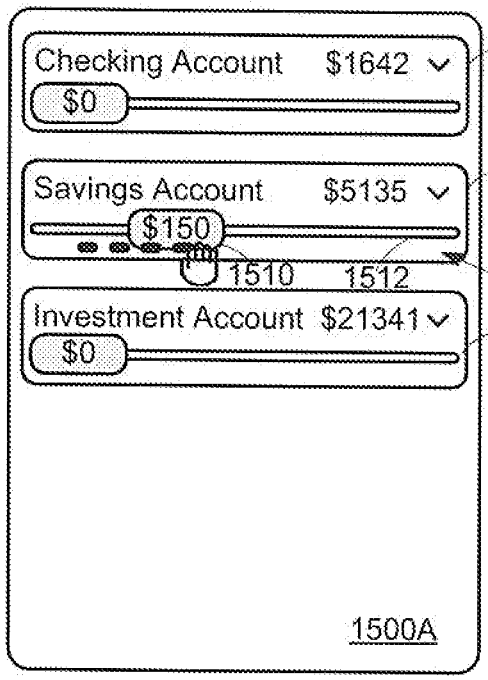

FIGS. 15-18 illustrate a money transfer allocation in accordance with a further example, transferring an amount from a source account to a destination account. FIG. 15 illustrates GUI 1500A having a plurality of allocation regions 1504-1508 associated with respective sources (e.g. accounts) and where each has a respective linear slider control (e.g. 1502) having a slide device (e.g. 1510) and line (e.g. 1512).

Figure 16:
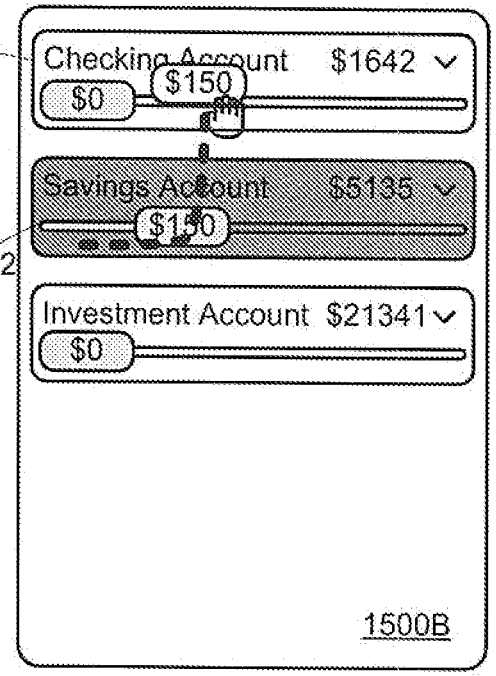
Figure 17:
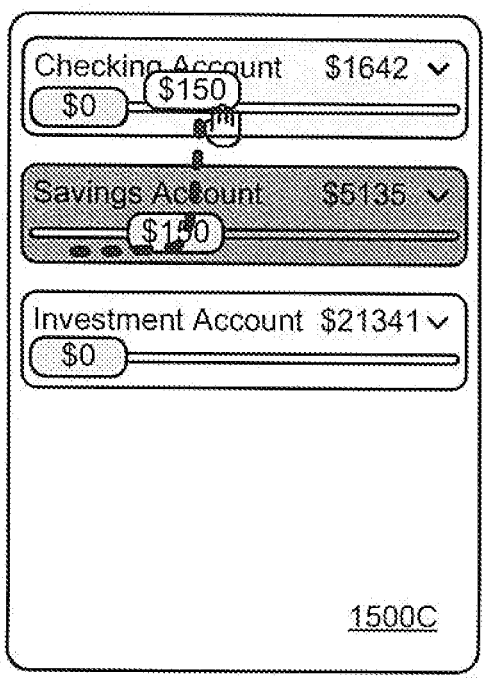
Figure 18:
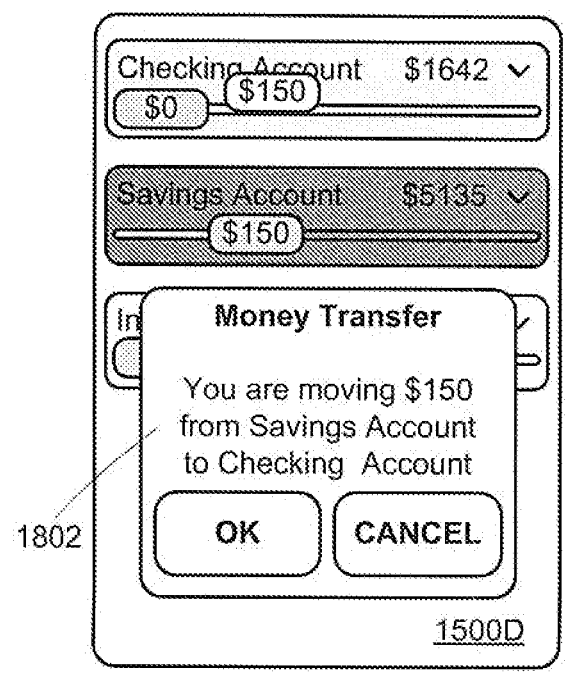

Selecting a particular slider control in a particular allocation region automatically selects the associated allocation source (account). Thereafter the other displayed allocation regions are defined as allocation destinations and the associated accounts treated accordingly. FIG. 16 illustrates GUI 1500B where a single swipe movement in two directions is shown. Similarly to the previous example, a first movement component of the swipe gesture in a first direction along the line (e.g. 1512) selects an amount ($150). A second movement away from the line to the allocation region 1504 associated with the checking account selects this account as the allocation destination such as following a pause movement over the allocation region (see GUI 1500C of FIG. 17). GUI 1500D of FIG. 18 illustrates a confirmation dialog and control 1802 to confirm the money transfer allocation instruction.

FIGS. 19-20 illustrate a further example interface where the single swipe gesture selects an allocation amount and an allocation destination, where the allocation source is selected in a different manner. GUI 1900A of FIG. 19 shows a plurality of allocation regions 1904, 1906, 1908 and 1914 associated with respective accounts. GUI 1900A further comprises a linear slider control 1902 having a slider device 1910 and a line 1912. A user instruction region 1916 display instructions with respect to selecting an allocation source such as by tapping an allocation region to select the associated source (account). Tapping may highlight (e.g. change a colour or shade) the allocation region 1904.

Selecting a particular allocation region automatically selects the associated allocation source (account). Thereafter the other allocation regions are defined as allocation destinations and the associated accounts treated accordingly. FIG. 20 illustrates GUI 1900B where a single swipe gesture in two directions is shown. Similarly to the previous examples in which a single swipe gesture is shown to select an amount and an allocation source or destination, a first movement component of the swipe gesture in a first direction along the line (e.g. 1912) selects an amount ($550). A second movement away from the line 1912 is directed to the allocation region 1908. This region is associated with a credit card as the allocation destination. A pause movement over the allocation region selects the allocation destination. The selection may be indicated by updating the allocation region 1908 (color or shading, etc.) Movement away from the line 1912 may be reflected as before, by displaying a second instance 2002 of slider device 1910 in response to the movement. To reflect that the selected source is not available to select as a destination, the allocation region 1904 may be updated such as by shading out the account. The allocation source selected in GUI 1900A may be displayed in GUI 1900B such as in instruction region 1916. Though not shown, tapping this region 1916 may enable a user to re-select the allocation source, for example, returning to GUI 1900A. To obtain more granular amounts using a slider control various operations may be performed. In one example, operations processing the swipe interaction with the slider control may determine the speed and acceleration of the swipe and use an operation to change the scale of the motion (i.e. the response to the swipe input) when changing the amount in a manner that is related to the speed/acceleration of the slide. For example, a user may receive a more granular scale to change the amount by smaller increments/decrements when slowing down and may receive a larger scale to change the amount by larger increments/decrements when moving fast over the same area of slider which allows for the inclusion of a very large scale over a very short slider bar. In another example, in response to a slowing down of the swipe, a stepped slider maybe presented. Slowing down provides a separate visual slider to do granular selection. In a further example, a second touch slide may be presented to receive input to control the granular scale for the user.

Figure 21:
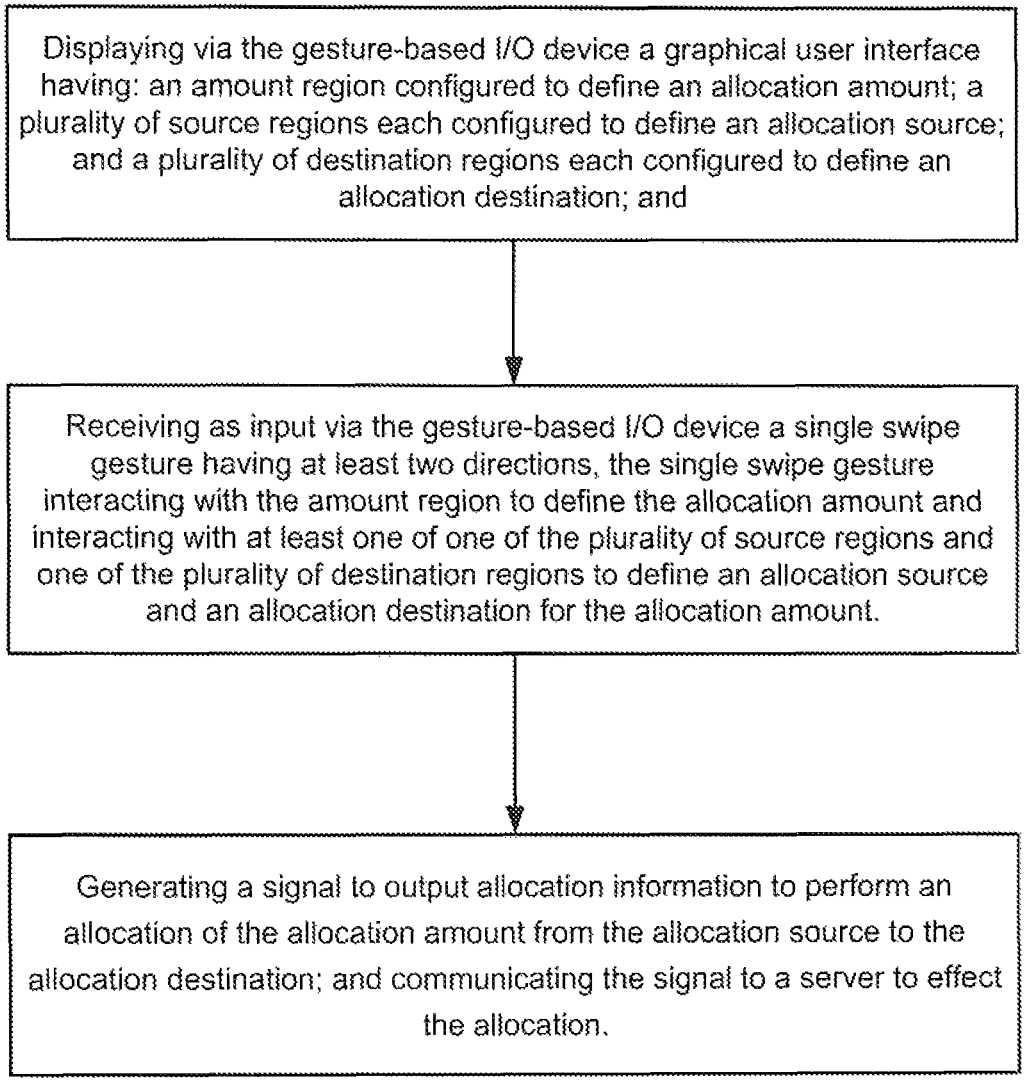
FIG. 21 is a flowchart illustrating an example operation of a computing device, in accordance with one or more aspects of the present disclosure.

FIG. 21 is a flowchart illustrating example operations 2100 of a computing device, in accordance with one or more aspects of the present disclosure. At 2102 operations display via the gesture-based I/O device (e.g. 104) a graphical user interface having: an amount region configured to define an allocation amount; a plurality of source regions each configured to define an allocation source; and a plurality of destination regions each configured to define an allocation destination. At 2102 the operations receive as input via the gesture-based I/O device a single swipe gesture having at least two directions, the single swipe gesture interacting with the amount region to define the allocation amount and interacting with at least one of one of the plurality of source regions and one of the plurality of destination regions to define an allocation source and an allocation destination for the allocation amount.

At 2104 operations generate a signal to output allocation information to perform an allocation of the allocation amount from the allocation source to the allocation destination. At 2106 operations communicate the signal to a server to effect the allocation.

It will be appreciated that in one aspect the teachings herein provide a method implemented by at least one processing device coupled to a memory and coupled to a gesture-based I/O device. The method comprises outputting a graphical user interface via the gesture-based I/O device, the graphical user interface comprising: a plurality of source regions and destination regions configured to define respective allocation sources and allocation destinations; and one or more amount regions configured to define an allocation amount, at least some of the amount regions displaying a respective linear slider control selectable for movement along a respective line within each of the at least some amount regions to define the allocation amount and for movement away from the line to select at least one of a particular source region and a particular destination region of the plurality of source regions and destination regions to respectively define an allocation source and/or allocation destination. The method further comprising receiving a single swipe gesture having at least two directions as input via the gesture-based I/O device, the single swipe gesture selecting and moving the respective linear slider control of one of the amount regions to define the allocation amount and moving to at least one of a particular source region and a particular destination region of the plurality of source regions and destination regions to define respectively at least one of the allocation source and the allocation destination. And outputting a signal, by the at least one processing device to a server, the signal comprising allocation information to perform an allocation of the allocation amount from the allocation source to the allocation destination In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Various embodiments of the invention have been described. These and other embodiments are within the scope of the following claims.

What is claimed is:

1. A computing device having a processor coupled to a memory and coupled to a gesture-based input/output (I/O) device, the memory storing instructions, which when executed by the processor, configure the computing device to:
   display via the gesture-based I/O device a graphical user interface having:
      an amount region configured to define an allocation amount;
      a plurality of source regions each configured to define an allocation source; and a plurality of destination regions each configured to define an allocation destination; and
receive as input via the gesture-based I/O device a swipe gesture consisting of a single continuous swipe having at least two directions, the single continuous swipe continuously engaging the gesture-based I/O device throughout the swipe gesture, the swipe gesture interacting with the amount region to define the allocation amount and interacting with at least one of: (i) a source region of the plurality of source regions and (ii) a destination region of the plurality of destination regions to define an allocation source and an allocation destination for the allocation amount; and,
wherein:
the amount region displays a selectable linear slider control comprising a slider device for movement along a line to variably define the allocation amount;
the swipe gesture comprises a plurality of connected consecutive swipe components including at least two movement components;
a first movement component of the plurality of consecutive connected swipe components defines the allocation amount, the first movement component moving in a first direction of the at least two directions to interact with the selectable linear slider control to move the slider device along the line in the first direction; and
a second movement component, after the first movement component, defines the allocation source or the allocation destination, the second movement component moving in a second direction of the at least two directions away from the line to move the slider device from the line to the source region or the destination region.

2. The computing device of claim 1, further configured to: generate a signal to communicate allocation information to perform an allocation of the allocation amount from the allocation source to the allocation destination; and communicate the signal to a server to effect the allocation.

3. The computing device of claim 1 further configured to: responsive to the first movement component:
display via the gesture-based I/O device the slider device of the selectable linear slider control to simulate movement along the line;
raise or lower the allocation amount; and
display via the gesture-based I/O device the allocation amount; and
responsive to the second movement component:
display via the gesture-based I/O device a second slider device to simulate movement in accordance with the movement away from the line; and
determine the allocation source or allocation destination as selected by the second movement component.

4. The computing device of claim 1 wherein the plurality of consecutive swipe components further comprises respective pause components, pausing movement to interact with at least one of the source region and the destination region to respectively define the allocation source and allocation destination.

5. The computing device of claim 1 wherein:
the second movement component defines the allocation source; and
the plurality of connected consecutive swipe components comprises a third movement component after the second movement component, the third movement component moving from the source region to the destination region to define the allocation destination.

6. The computing device of claim 1 wherein:
the gesture-based I/O device displays a plurality of amount regions each configured to define an allocation amount;
each of the plurality of amount regions displaying a respective selectable linear slider control for movement along a respective line;
the plurality of amount regions are associated with respective ones of the plurality of source regions;
the swipe gesture comprises a plurality of consecutive swipe components including at least two movement components;
a first movement component of the plurality of consecutive swipe components selects one respective selectable linear slider control thereby selecting the source region to define the allocation source, the first movement component moving in a first direction to interact with the one respective selectable slider control for movement along the respective line to define the allocation amount; and
a second movement component, after the first movement component, of the plurality of consecutive swipe components defines the allocation destination, the second movement component moving in a second direction away from the respective line to the destination region.

7. The computing device of claim 6 further configured to: responsive to the first movement component:
display via the gesture-based I/O device a slider device of the one respective selectable linear slider control to simulate movement along the line;
raise or lower the allocation amount;
display via the gesture-based I/O device the allocation amount for display; and
responsive to the second movement component:
display via the gesture-based I/O device a second slider device to simulate movement away from the respective line; and
determine the allocation destination as selected by the second movement component to the destination region.

8. The computing device of claim 6 wherein the plurality of consecutive swipe components comprises a pause component pausing movement to interact with the destination region to define the allocation destination.

9. The computing device of claim 1 wherein the swipe gesture comprises a plurality of consecutive swipe components including movement components and pause components and the computing device is configured to display via the gesture-based I/O device the plurality of destination regions following a pause component interacting with the source region which defines the allocation source.

10. The computing device of claim 1 wherein the gesture-based input/output device is a touch sensitive display screen device.

11. A method implemented by a computing device having a processor coupled to a memory and coupled to a gesture-based input/output (I/O) device, the method comprising:
displaying via the gesture-based I/O device a graphical user interface having:
an amount region configured to define an allocation amount;
a plurality of source regions each configured to define an allocation source; and
a plurality of destination regions each configured to define an allocation destination; and
receiving as input via the gesture-based I/O device a swipe gesture consisting of a single continuous swipe having at least two directions, the single continuous swipe continuously engaging the gesture-based I/O device throughout the swipe gesture, the swipe gesture interacting with the amount region to define the allocation amount and interacting with at least one of (i) a source region of the plurality of source regions and (ii) a destination region of the plurality of destination regions to define an allocation source and an allocation destination for the allocation amount; and, wherein:
the amount region displays a selectable linear slider control comprising a slider device for movement along a line to variably define the allocation amount;
the swipe gesture comprises a plurality of connected consecutive swipe components including at least two movement components;
a first movement component of the plurality of consecutive connected swipe components defines the allocation amount, the first movement component moving in a first direction of the at least two directions to interact with the selectable linear slider control to move the slider device along the line in the first direction; and
a second movement component, after the first movement component, defines the allocation source or the allocation destination, the second movement component moving in a second direction of the at least two directions away from the line to move the slider device from the line to the source region or the destination region.

12. The method of claim 11, further comprising:
generating a signal to communicate allocation information to perform an allocation of the allocation amount from the allocation source to the allocation destination and communicating the signal to a server to effect the allocation.

13. The method of claim 11 further comprising:
responsive to the first movement component:
displaying via the gesture-based I/O device the slider device of the selectable linear slider control to simulate movement along the line;
raising or lowering the allocation amount; and
displaying via the gesture-based I/O device the allocation amount for display; and
responsive to the second movement component:
displaying via the gesture-based I/O device a second slider device to simulate movement in accordance with the movement away from the line; and
determining the allocation source or allocation destination as selected by the second movement component.

14. The method of claim 11 wherein the plurality of consecutive swipe components further comprises respective pause components, pausing movement to interact with at least one of the plurality of source regions or one of the plurality of destination regions to respectively define the allocation source and allocation destination.

15. The method of claim 11 wherein:
the second movement component defines the allocation source; and
the plurality of connected consecutive swipe components comprises a third movement component after the second movement component, the third movement component moving from one of the plurality of source regions to one of the plurality of destination regions to define the allocation destination.

16. The method of claim 11 wherein:
the method displays via the gesture-based I/O device a plurality of amount regions each configured to define an allocation amount;
each of the plurality of amount regions displays a respective selectable linear slider control for movement along a respective line;
the plurality of amount regions are associated with respective ones of the plurality of source regions;
the swipe gesture comprises a plurality of consecutive swipe components including at least two movement components;
a first movement component of the plurality of consecutive swipe components selects one respective selectable linear slider control thereby selecting an associated source region to define the allocation source, the first movement component moving in a first direction to interact with the one respective selectable slider control for movement along the respective line to define the allocation amount; and
a second movement component, after the first movement component, of the plurality of consecutive swipe components defines the allocation destination, the second movement component moving in a second direction away from the respective line to one of the plurality of destination regions.

17. The method of claim 11 wherein the swipe gesture comprises a plurality of consecutive swipe components including movement components and pause components and the method comprises display via the gesture-based I/O device the plurality of destination regions following a pause component interacting with the source region which defines the allocation source.

18. A non-transitory computer readable medium storing instructions data, which when executed by a processor of a computing device, the processor coupled to a memory and to a gesture-based input/output (I/O) device, configure the computing device to:
display via the gesture-based I/O device a graphical user interface having:
an amount region configured to define an allocation amount;
a plurality of source regions each configured to define an allocation source; and
a plurality of destination regions each configured to define an allocation destination; and
receive as input via the gesture-based I/O device a swipe gesture consisting of a single continuous swipe having at least two directions, the single continuous swipe continuously engaging the gesture-based I/O device throughout the swipe gesture, the swipe gesture interacting with the amount region to define the allocation amount and interacting with at least one of (i) a source region of the plurality of source regions and (ii) a destination region of the plurality of destination regions to define an allocation source and an allocation destination for the allocation amount; and,
wherein:
the amount region displays a selectable linear slider control comprising a slider device for movement along a line to variably define the allocation amount;
the swipe gesture comprises a plurality of connected consecutive swipe components including at least two movement components;
a first movement component of the plurality of consecutive connected swipe components defines the allocation amount, the first movement component moving in a first direction of the at least two directions to interact with the selectable linear slider control to move the slider device along the line in the first direction; and a second movement component, after the first movement component, defines the allocation source or the allocation destination, the second movement component moving in a second direction of the at least two directions away from the line to move the slider device from the line to the source region or the destination region.

19. The system of claim 3 wherein the slider device is a graphical element for selection and movement along the selectable linear slider control and wherein the second slider device is a second instance of the slider device and the second slider device is displayed in response to the second movement in the second direction that moves the slider device away from the line of the selectable line slider control to the source region or the destination region.

20. The system of claim 7 wherein the slider device is a graphical element for selection and movement along the selectable linear slider control and wherein the second slider device is a second instance of the slider device and the second slider device is displayed in response to the second movement in the second direction that moves the slider device away from the line of the selectable line slider control to the source region or the destination region.

21. The method of claim 13 wherein the slider device is a graphical element for selection and movement along the selectable linear slider control and wherein the second slider device is a second instance of the slider device and the second slider device is displayed in response to the second movement in the second direction that moves the slider device away from the line of the selectable line slider control to the source region or the destination region.

* * * * *